(12) United States Patent
Gamble et al.

(10) Patent No.: US 9,908,161 B1
(45) Date of Patent: Mar. 6, 2018

(54) DEFECT REPAIR TOOL AND METHOD OF USING THE SAME

(71) Applicant: Honda Motor Co., Ltd., Minato-ku, Tokyo (JP)

(72) Inventors: John E. Gamble, Oro-Medonte (CA); Michael Smith, Richmond Hill (CA)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/685,191

(22) Filed: Aug. 24, 2017

(51) Int. Cl.
*B21J 9/18* (2006.01)
*B21D 1/10* (2006.01)
*B21D 1/12* (2006.01)
*B23Q 17/00* (2006.01)
*B21J 13/08* (2006.01)

(52) U.S. Cl.
CPC .............. *B21D 1/10* (2013.01); *B21D 1/12* (2013.01); *B21J 9/18* (2013.01); *B21J 13/08* (2013.01); *B23Q 17/00* (2013.01)

(58) Field of Classification Search
CPC .. B21D 1/10; B21D 1/12; B23Q 17/00; B25B 25/18; B25B 3/46; B21J 9/18; B21J 13/08
USPC .......................................................... 72/457
See application file for complete search history.

(56) References Cited

U.S. PATENT DOCUMENTS

| | | | |
|---|---|---|---|
| 3,030,837 A | 4/1962 | Chartier | |
| 3,483,727 A | 12/1969 | Giannetto | |
| 3,744,291 A | 7/1973 | Hagerty | |
| 4,495,791 A | 1/1985 | Kemnitz | |
| 5,730,023 A | 3/1998 | Gmeilbauer | |
| 6,539,770 B2 | 4/2003 | Olsson | |
| 7,036,211 B1 | 5/2006 | Panks | |
| 7,509,721 B1 * | 3/2009 | Liang | A41H 37/005 29/243.5 |
| 8,327,516 B2 * | 12/2012 | Kliskey | B60C 25/18 29/253 |
| 8,516,873 B1 | 8/2013 | Chan | |
| 2012/0103644 A1 | 5/2012 | Walsh | |

* cited by examiner

*Primary Examiner* — David B Jones
(74) *Attorney, Agent, or Firm* — Honda Patents & Technologies North America, LLC; Andrew Kefalonitis, Jr.

(57) ABSTRACT

A tool for repairing defects in a member is provided. The tool includes a first housing, a second housing, and a shaft positioned at least partially within the first housing and the second housing. The shaft is configured to move along a longitudinal axis of the tool with respect to the first housing and the second housing. Furthermore, the tool includes an anvil coupled to the second housing, a biasing device coupled to the shaft and to the anvil, and a tip coupled to the anvil. The anvil is configured to be selectively contacted by the shaft and to transmit a force received from the shaft to the tip.

20 Claims, 10 Drawing Sheets

DEFECT REPAIR TOOL AND METHOD OF USING THE SAME

BACKGROUND

The embodiments described herein relate generally to removing a defect from a metal panel, and more specifically, to a method and apparatus for applying a known force in a consistent and repeatable manner to a defect in a metal panel to remove the defect from the panel.

Many products include parts formed from sheet metal, for example steel sheets, aluminum sheets, and/or other metals. The sheet metal is often stamped into a desired shape. The final stamped part may be referred to as a panel. In the specific example of an automobile, stamped panels may be referred to as body panels and include a hood panel, a side panel, a door panel, a roof panel, etc. Automobiles, aircraft, and other vehicles may include many panels formed from sheet metal.

A defect is an imperfection in what would otherwise be a smooth surface of a body panel. For example, the defect may be a dent or a protrusion. Since body panels are relatively thin, a dent within one surface of the body panel may appear as a protrusion within the opposite surface of the body panel. Defects may be introduced to a body panel during the stamping process itself, for example, due to an imperfection or debris within a stamping press. Furthermore, defects may be introduced to a body panel after stamping, for example, during transport or installation of the body panel onto the vehicle.

Typically, if a defect is discovered in a body panel during manufacturing of an automobile, the defect is either pounded out, sanded down, or pulled. For example, if a dent is present on a visible surface (i.e., the surface of the panel that will be visible on the completed vehicle), the corresponding protrusion on the non-visible surface of the panel may be pounded out. More specifically, a hammer may be used to apply a tapping force on a tool used to direct that force onto the protrusion, in order to lower the protrusion and the corresponding dent to the same level as the surrounding material. This method requires two hands and can only be used on the non-visible surface of a panel to avoid creating additional imperfections on the visible surface of the panel. Sanding a protrusion off of the visible surface of a panel introduces the risk of removing a higher than desirable amount of material. The efficacy of each of these methods is dependent upon a skill level of the person performing the work.

BRIEF SUMMARY

In one aspect, a tool for repairing defects in sheet metal is provided. The tool may include a first housing; a second housing; a shaft positioned at least partially within the interior portion of the first housing and the interior portion of the second housing; an anvil coupled to the second end of the second housing; a biasing device coupled to the shaft and to the anvil; and/or a tip coupled to the anvil, the anvil configured to be selectively contacted by the shaft, and to transmit a force received from the shaft to the tip.

In another aspect, a method for repairing a defect in sheet metal using a defect repair tool is provided. The defect repair tool may include a plurality of removable tips and an adjustable maximum force. The method includes identifying a first defect category of a plurality of defect categories that defines the defect, positioning, on the defect repair tool, a first tip of the plurality of removable tips associated with the first defect category, and adjusting the maximum force of the defect repair tool to a first force level associated with the first defect category. The method also includes positioning the first tip against the defect, pulling a shaft of the defect repair tool until fully extended, and releasing the shaft of the defect repair tool to exert a force on the defect.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

The apparatus and methods described herein facilitate removing and/or reducing the appearance of a defect in a metal panel. More specifically, the apparatus and methods described herein facilitate applying a known force in a consistent and repeatable manner to a defect in a metal panel to remove the defect from the panel.

DRAWINGS

Figure 1:
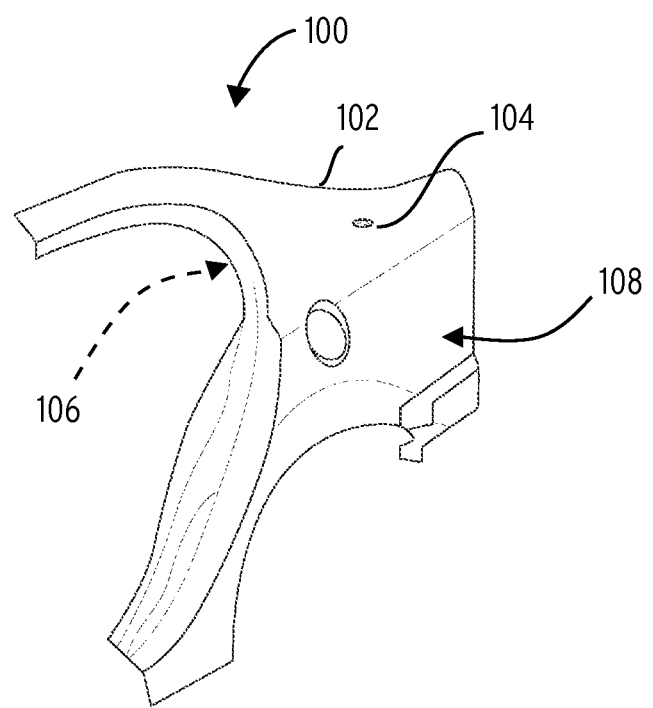
FIG. 1 is a perspective view of an exemplary vehicle body panel.

FIG. 1 is a perspective view 100 of an exemplary vehicle body panel 102. Multiple body panels are coupled to form a body of a vehicle. In the exemplary embodiment, body panel 102 is a stamped part, formed from sheet metal. Body panel 102 includes a first surface 106 facing an interior of the vehicle and a second surface 108 facing an exterior of the vehicle. In the exemplary embodiment, body panel 102 includes a defect 104. Defect 104 is an imperfection in what would otherwise be a smooth surface. For example, body panel 102 may be a metal panel and defect 104 may be a dent or a protrusion. Since body panel 102 is relatively thin, a dent within first surface 106 will appear as a protrusion within second surface 108, and conversely, a protrusion within first surface 106 will appear as a dent within second surface 108. Hereinafter, defect 104 will be referred to using descriptions based on observing the defect 104 from the exterior of the vehicle. For example, a dent is an imperfection that, when observed from the exterior of the vehicle, is an indentation within the second surface 108 of body panel 102. A protrusion is an imperfection that is a raised portion within second surface 108 of body panel 102. Defect 104 may be created within a stamping process used to form body panel 102, which may result in many body panels that include a substantially similar defect. Defect 104 may also be caused by accidental contact with body panel 102 during the manufacturing process or transit of body panel 102, resulting in a single, random defect 104.

Figure 2:
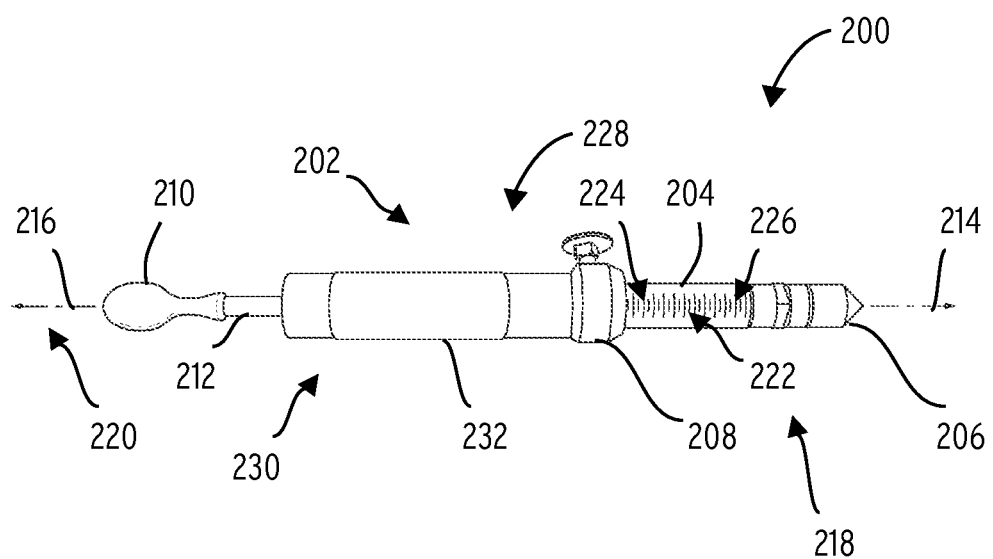
FIG. 2 is a side view of an exemplary embodiment of a defect repair tool.

FIG. 2 is a side view 200 of an exemplary embodiment of a defect repair tool 202. Defect repair tool 202 facilitates applying a repeatable, predetermined amount of force to a defect, for example, defect 104 shown in FIG. 1. For example, a stamped body panel, for example, body panel 102 shown in FIG. 1, may be found to include defect 104 that would end up as a visible defect on the assembled vehicle if not repaired. In other examples, the stamped body panel that includes a defect may already be included on a vehicle white body (i.e., a partially assembled vehicle). It is desirable to remove the defect from the panel rather than to replace the panel. In the example of vehicle body panels, the panels are typically aluminum or steel. However, defect repair tool 202 may be used to remove defects from other types of materials.

In the exemplary embodiment, defect repair tool 202 includes a housing 228. Housing 228 includes a first end 230 and a second end 218. In the exemplary embodiment, housing 228 includes a first housing 232 and a second housing 204. Defect repair tool 202 also includes a tip 206, an adjustment collar 208, a handle 210, and a shaft 212. In the exemplary embodiment, tip 206 is formed from a hard nylon material and is designed to remove defects from unpainted stamped parts.

Furthermore, second housing 204 includes a plurality of indicia 222 and/or markings indicating positions of adjustment collar 208 that correspond to a plurality of predefined force levels. Plurality of indicia 222 may include lines, numbers, letters, symbols, varied colors, and/or any other type of markings that convey a specific position on second housing 204 that corresponds to a predefined force level. For example, plurality of indicia 222 may include a first indicia 224 that corresponds to a first force level and a second indicia 226 that corresponds to a second force level.

Handle 210 is coupled to shaft 212 and is positioned at least partially exterior to first housing 232 and second housing 204. In operation, a user holds tip 206 against defect 104 by grasping first housing 232 and/or second housing 204 with one hand, and pulls handle 210 along a longitudinal axis 220 in a first direction 216. When the user releases handle 210, a force is transmitted in a second direction 214. In some embodiments, handle 210 may be replaceable. For example, a handle having greater mass may be used when a larger impact is desired. Conversely, a handle having less mass may be used when a smaller impact is desired.

Figure 3:
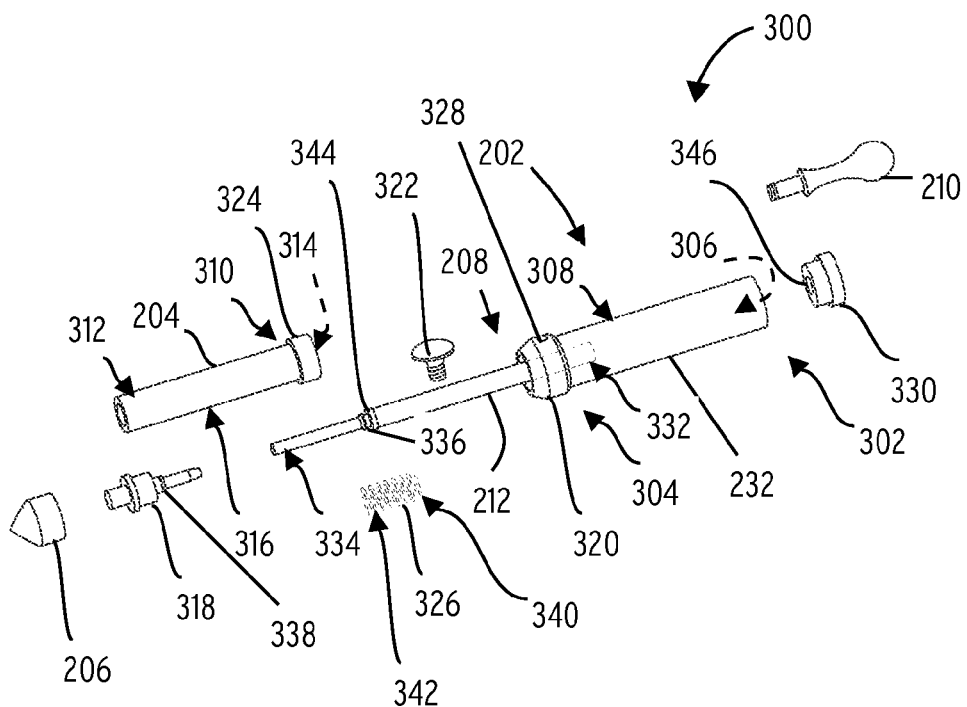
FIG. 3 is an exploded view of the defect repair tool shown in FIG. 2.

FIG. 3 is an exploded view 300 of the defect repair tool 202 shown in FIG. 2. In the exemplary embodiment, first housing 232 is substantially cylindrical and includes a first end 302 and a second end 304. Furthermore, the first housing 232 defines an interior portion 306 and an exterior surface 308. Second housing 204 is also substantially cylindrical and includes a first end 310 and a second end 312. Furthermore, the second housing 204 defines an interior portion 314 and an exterior surface 316. Moreover, shaft 212 includes a first end 332 and a second end 334.

In the exemplary embodiment, second housing 204 is positioned at least partially within interior portion 306 of first housing 232. Furthermore, shaft 212 is positioned at least partially within interior portion 314 of second housing 204. Defect repair tool 202 also includes a biasing device 326. In the exemplary embodiment, biasing device 326 is a spring positioned around a portion of shaft 212. Although described herein as a spring, biasing device 326 may include any other biasing device that stores and releases energy. Biasing device 326 is configured to bias second end 334 of shaft 212 toward an anvil 318. As referred to herein, the force applied by defect repair tool 202 is a restoring force created in biasing device 326 by a user stretching biasing device 326 by pulling handle 210 in a first direction 216 with respect to defect repair tool 202. Shaft 212 is configured to transmit, to anvil 318, the restoring force from biasing device 326 contracting from an extended state to an equilibrium state.

In the exemplary embodiment, second housing 204 includes a flange 324 extending outwardly from exterior surface 316 of second housing 204 and configured to prevent removal of second housing 204 from second end 304 of first housing 232. Furthermore, defect repair tool 202 may also include an end cap 330 removably coupled to defect repair tool 202 and configured to prevent removal of second housing 204 from first end 302 of first housing 232. Moreover, end cap 330 includes an opening 346 defined therein. Shaft 212 includes a flange 344 having a diameter greater than the diameter of the shaft 212. Opening 346 is large enough to allow shaft 212 to extend therethrough, however, opening 346 is small enough to prevent flange 344 from being pulled through opening 346. Interaction of opening 346 and flange 344 creates a stop, that is, a repeatable, maximum distance that handle 210 can be pulled at a given force setting.

In the exemplary embodiment, adjustment collar 208 includes a collar 320 and a threaded fastener 322. Collar 320 includes a threaded opening 328 configured to receive threaded fastener 322. When threaded fastener 322 is loosened, second housing 204 can move along a longitudinal axis 220 (shown in FIG. 2) of defect repair tool 202. When threaded fastener 322 is tightened, second housing 204 is fixed with respect to first housing 232. Although described as including a threaded fastener 322 and threaded opening 328, adjustment collar 208 may include any securing device that selectively allows movement between first housing 232 and second housing 204. Positioning second housing 204 at different positions with respect to first housing 232 facilitates setting different maximum force levels that defect repair tool 202 is able to produce.

In the exemplary embodiment, defect repair tool 202 also includes anvil 318. Anvil 318 is coupled to second end 312 of second housing 204. Tip 206 is removably coupled to anvil 318. Shaft 212 includes a first coupler 336 configured to couple a first end 340 of biasing device 326 to shaft 212. Anvil 318 includes a second coupler 338 configured to couple a second end 342 of biasing device 326 to anvil 318. In operation, second end 334 of shaft 212 strikes anvil 318, transferring a force to tip 206. In some embodiments, anvil 318 includes two portions. A first portion (e.g., a collar) that retains anvil 318 at least partially within second housing 204 and a second portion that is movable with respect to the first portion. The second portion transmits the impact energy from shaft 212 to tip 206. A two-part anvil 318 isolates first housing 232 and second housing 204 from impact energy when defect repair tool 202 is in use.

Figure 4:
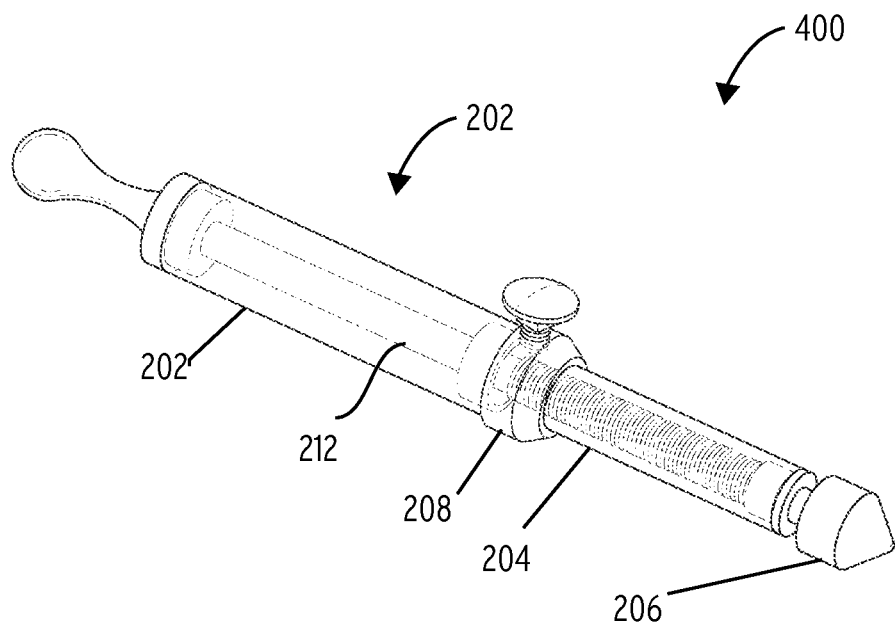
FIG. 4 is a first perspective view of an exemplary embodiment of the defect repair tool shown in FIG. 2.

FIG. 4 is a first perspective view 400 of an exemplary embodiment of the defect repair tool 202 shown in FIG. 2. In first perspective view 400, first housing 232, second housing 204, and adjustment collar 208 are illustrated as transparent, facilitating viewing of components positioned within interior portion 306 (shown in FIG. 3) of first housing 232 and interior portion 314 (shown in FIG. 3) of second housing 204.

Figure 5:
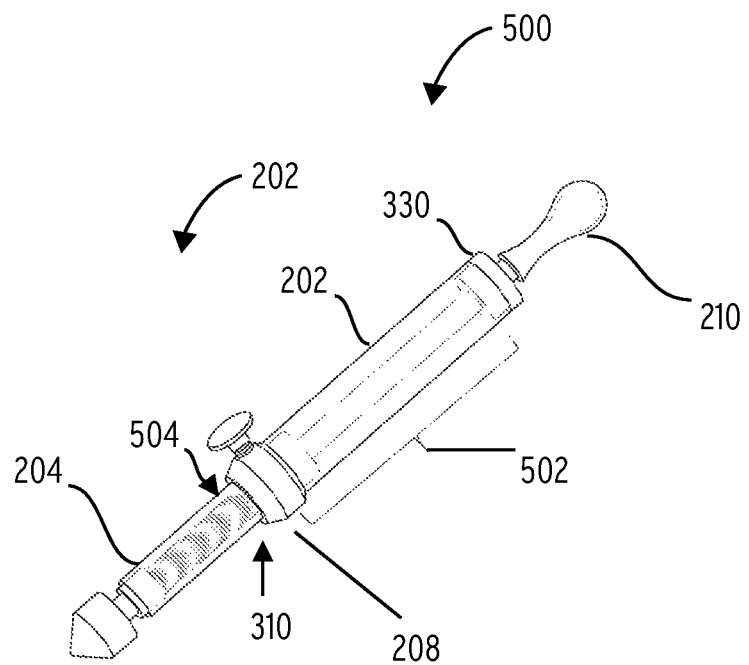
FIG. 5 is a second perspective view of the defect repair tool shown in FIG. 2, in a first force level configuration.

FIG. 5 is a second perspective view 500 of the defect repair tool 202 in a first force level configuration. In the first force level configuration, adjustment collar 208 is tightened around first end 310 of second housing 204. For example, an edge 504 of adjustment collar 208 may be aligned with first indicia 224 (shown in FIG. 2). When first housing 232 and second housing 204 are positioned in this manner, handle 210 can be pulled in first direction 216 (shown in FIG. 2) a first distance 502. As described above, flange 344 (shown in FIG. 3) cannot be pulled through opening 346 (shown in FIG. 3), and therefore, handle 210 can be pulled a maximum of first distance 502. Since an energy storing ability of biasing device 326 is a fixed value, and the hard stop created by flange 344 and end cap 330 facilitates pulling handle 210 first distance 502, which is a fixed distance, the force applied by defect repair tool 202 at a given force level configuration is constant and repeatable.

Figure 6:
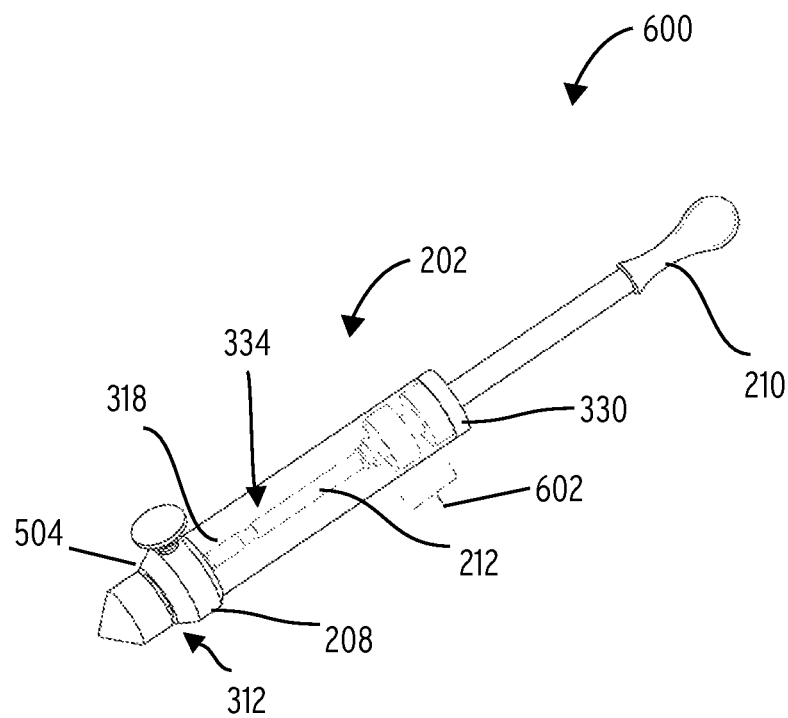
FIG. 6 is a third perspective view of the defect repair tool shown in FIG. 2, in a second force level configuration.

FIG. 6 is a third perspective view 600 of the defect repair tool 202 in a second force level configuration. In third perspective view 600, second housing 204 (other than flange 324) and biasing device 326 are not shown in order to view where second end 334 of shaft 212 contacts anvil 318. In the second force level configuration, adjustment collar 208 is tightened around second end 312 of second housing 204. For example, edge 504 of adjustment collar 208 may be aligned with second indicia 226 (shown in FIG. 2) on second housing 204. When first housing 232 and second housing 204 are positioned in this manner, handle 210 can be pulled in first direction 216 (shown in FIG. 2) a second distance 602. Second distance 602 is less than first distance 502 (shown in FIG. 5). As described above, flange 344 cannot be pulled through opening 346 (shown in FIG. 3), and therefore, handle 210 can be pulled a maximum of second distance 602. The second force level configuration allows defect repair tool 202 to consistently apply a level of force that is lower than the level of force applied in the first force level configuration.

Two force level configurations are described above. The first force level configuration applies the most force that defect repair tool 202 can possibly apply. The second force level configuration applies the lowest force that defect repair tool 202 can apply. Any number of indicia can be included on defect repair tool 202, corresponding to various force levels between the first force level configuration and the second force level configuration, and defect repair tool 202 can apply any amount of force between the maximum and minimum.

Figure 7:
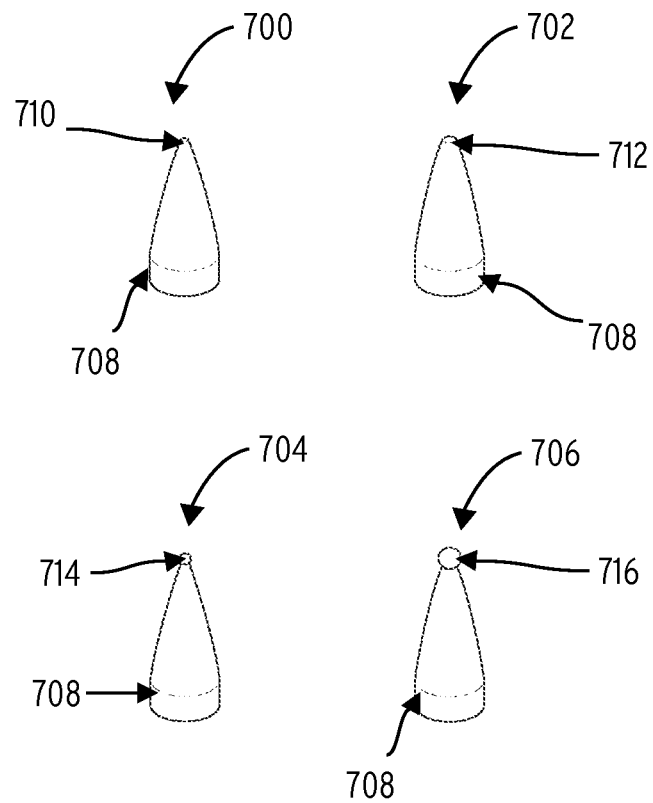
FIG. 7 is a perspective view of alternative embodiments of tips that may be coupled to the defect repair tool shown in FIG. 2.

FIG. 7 is a perspective view of alternative embodiments of tip 206 that may be coupled to the defect repair tool 202 shown in FIG. 2. In the exemplary embodiment, tip 206 is formed from a hard nylon material and is designed to remove defects from unpainted stamped parts. The alternative embodiments may include a first alternative tip 700, a second alternative tip 702, a third alternative tip 704, and a fourth alternative tip 706. Each of first alternative tip 700, second alternative tip 702, third alternative tip 704, and fourth alternative tip 706 is designed to repair a specific type of defect. For example, first alternative tip 700 may be configured to remove a first type of defect and second alternative tip 702 may be configured to remove a second type of defect. Various types of defects may be defined by their depth, width, whether they are dents or protrusions, the type of material, whether the surface is painted or unpainted, and/or any other feature that distinguishes different defects.

First alternative tip 700 includes a first end 708 and a second end 710. First end 708 is configured to removably couple first alternative tip 700 together with anvil 318. For example, first end 708 and anvil 318 may include corresponding threaded fasteners configured to removably couple first alternative tip 700 and anvil 318. Alternatively, first end 708 and anvil 318 may be coupled using a friction fit type arrangement and/or any other type of connecting features that allow defect repair tool 202 to function as described herein. First alternative tip 700, second alternative tip 702, third alternative tip 704, and fourth alternative tip 706 each includes first end 708, which enables each alternative tip to be coupled to anvil 318.

Second alternative tip 702 includes a second end 712 that is different from second end 710 of first alternative tip 700. For example, second end 712 of second alternative tip 702 includes a relatively small flat surface, whereas, second end 710 of first alternative tip 700 includes a rounded point. Similarly, each of a second end 714 of third alternative tip 704 and a second end 716 of fourth alternative tip 706 are different from each other and also different from second end 710 and second end 712. Second end 710, second end 712, second end 714, and second end 716 each produce a different effect when a force from defect repair tool 202 is transmitted through the tips to defect 104. Tips 700, 702, 704, and 706 may be formed from a coated steel, for example, a plastic and/or polyurethane coated steel. The coating prevents the tip from damaging the paint on a painted body panel. Alternatively, tips 700, 702, 704, and 706 may be formed from uncoated steel. When defect 104 is a dent, removal may first include applying a force from defect repair tool 202 to a back side (e.g., first surface 106) of body panel 102. Since the back side is not painted, an uncoated steel tip may be used without concern for damaging paint on a visible surface.

Figure 8:
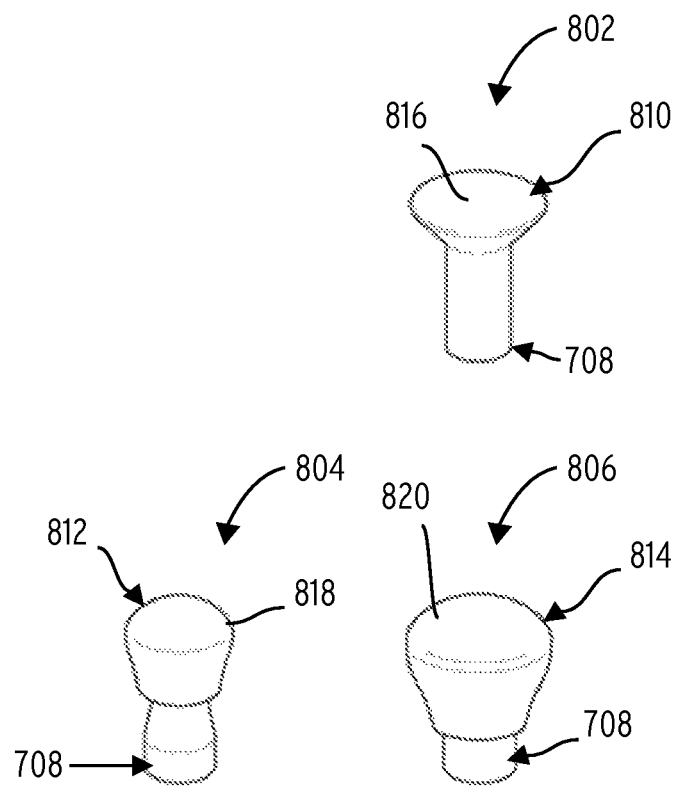
FIG. 8 is a perspective view of additional alternative embodiments of tips that may be coupled to the defect repair tool shown in FIG. 2.

FIG. 8 is a perspective view of additional alternative embodiments of tip 206 that may be coupled to the defect repair tool 202. The alternative embodiments may include a fifth alternative tip 802, a sixth alternative tip 804, and a seventh alternative tip 806. As described above with respect to FIG. 7, each of fifth alternative tip 802, sixth alternative tip 804, and seventh alternative tip 806 includes first end 708. Common first end 708 allows each of the alternative tips to be coupled to the same anvil 318. Fifth alternative tip 802 includes a second end 810. Second end 810 includes a substantially flat, circular surface 816. Sixth alternative tip 804 includes a second end 812 that is narrower than second end 810 and includes a curved surface 818. Seventh alternative tip 806 includes a second end 814 having a diameter similar to the diameter of second end 810. Furthermore, second end 814 includes a curved surface 820 having a higher radius of curvature than curved surface 818. The more sharply pointed tips shown in FIG. 7 are typically used to repair smaller, well defined defects. In contrast, the broader, rounder tips shown in FIG. 8 are used to repair larger diameter defects.

Defect repair tool 202 is configured to work with custom tips, for example, tip 206, as well as with commercially available tips, for example, first alternative tip 700, second alternative tip 702, third alternative tip 704, fourth alternative tip 706, fifth alternative tip 802, sixth alternative tip 804, and/or seventh alternative tip 806. For example, the tips shown in FIG. 7 and FIG. 8 are available for purchase from Dentcraft Tools L.P. of Oklahoma City, Okla. Commercially available tips are typically used with other types of tools, for example, knockdowns and knockdown hammers.

Figure 9:
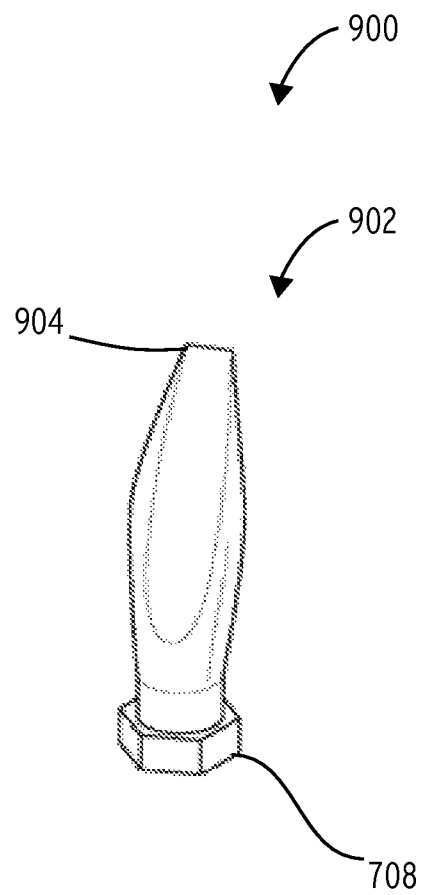
FIG. 9 is a perspective view of an additional alternative embodiment of a tip that may be coupled to the defect repair tool shown in FIG. 2.

FIG. 9 is a perspective view 900 of an eighth alternative tip 902 that may be coupled to the defect repair tool 202 shown in FIG. 2. Eighth alternative tip 902 includes first end 708, which allows eighth alternative tip 902 to be coupled to the anvil 318. Eighth alternative tip 902 also includes a second end 904 having a flat, blade-like surface. Eighth alternative tip 902 is not used to repair defects, but rather, is designed as a driver check bit used to verify spot weld integrity. Eighth alternative tip 902 facilitates applying a consistent, known force from defect repair tool 202 to a spot weld to verify the integrity of the spot weld.

Figure 10:
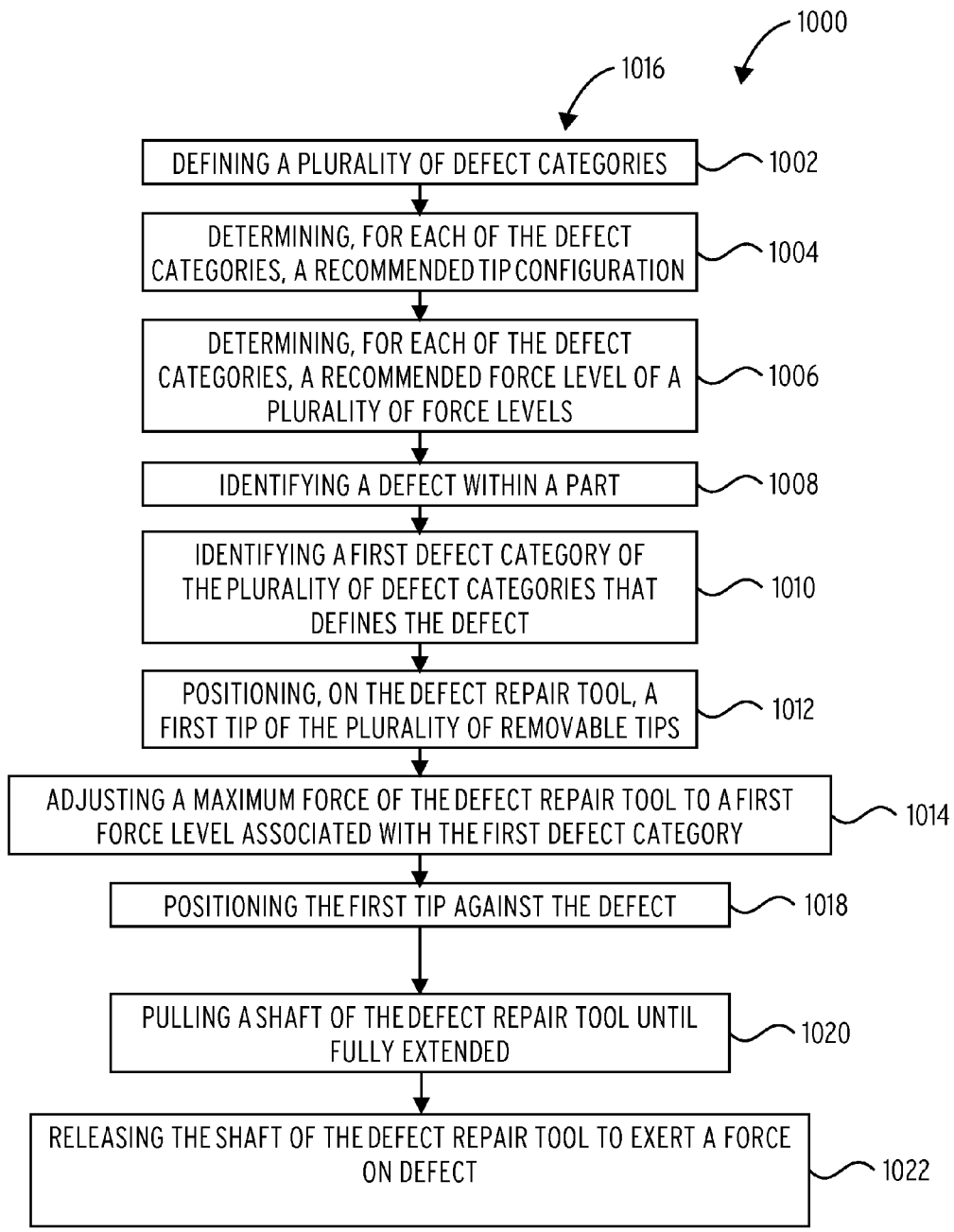
FIG. 10 is a flow chart illustrating an exemplary method of removing and/or reducing the appearance of a defect in a metal panel.

FIG. 10 is a flow chart 1000 illustrating an exemplary method 1016 for using a defect repair tool, for example, the defect repair tool 202 shown in FIG. 2. Method 1016 uses defect repair tool 202 to repair a defect in a part. As described above, defect repair tool 202 includes a plurality of removable tips and adjustable force configurations.

In some embodiments, method 1016 includes steps performed in advance of finding a defect in a part, and involves testing to determine the most successful technique for removing a defect. For example, method 1016 may include defining 1002 a plurality of defect categories based at least partially on a depth, a diameter, a shape, and a location of the defect. The defect categories are predefined, and are used to categorize common types of defects that have been found in the past. More specifically, common defects found in a particular sheet metal part may be analyzed to discover similarities between a large number of different defects. The different defects may then be categorized in order to end up with a reasonable number of categories into which discovered defects can be assigned. For example, a first defect category may be defined to include defects having similar depth, diameter, shape, and location on a part.

Method 1016 may also include determining 1004, for each of the defect categories, a tip configuration able to substantially remove defects in that category. For example, through testing, it may be determined that first alternative tip 700 is most successful at repairing defects in the first defect category. Method 1016 may also include determining 1006, for each of the defect categories, an amount of force necessary to remove defects in that category. For example, through testing, a first force level may be determined (i.e., an amount of force predetermined to substantially remove the defect) that when applied by the selected tip, is most successful at repairing a defect in the first defect category. Furthermore, a number of hits may also be determined. For example, to remove a relatively large defect, several lighter hits may better remove a defect than a single heavier hit. Several lighter hits may slowly bring the deform down to a minimum size, without causing the defect to cave.

As described above, first indicia 224 on defect repair tool 202 may correspond to the first force level. When adjustment collar 208 is aligned with first indicia 224, and handle 210 is pulled as far as defect repair tool 202 allows, defect repair tool 202 will apply a force at the first force level. A description of the plurality of defect categories, and the corresponding tip and force level predetermined to have the highest success in removing defects in each category, may be presented to the user of defect repair tool 202 on a chart, or any other type of visual aid or document that provides the user with easy access to both the defect categories and tool settings that, through testing, have proven most successful.

Although described above as being determined in advance of discovering a defect in a part, the above determinations can be made through testing on a first part of a plurality of parts discovered with the same defect. More specifically, a plurality of parts may all be found to include the same defect. A user of defect repair tool 202 can determine the tip and force setting that is most successful at removing this defect, and apply the same tip and force settings to the rest of the parts. Since defect repair tool 202 can apply a consistent amount of force, through the selected tip, the plurality of defects can be efficiently removed. Moreover, defect repair tool 202 can also be used to remove one-of-a-kind defects, although, the benefits of the consistent, repeatable force are not applicable in that situation.

In the exemplary embodiment, method 1016 includes identifying 1008 a defect, for example, defect 104 (shown in FIG. 1) within a part. Identifying 1008 may be accomplished using an automated vision system or manually through inspection by a worker. Method 1016 also includes identifying 1010 a first defect category of the plurality of defect categories that defines the defect. Method 1016 further includes positioning 1012, on the defect repair tool 202, a first tip of the plurality of removable tips corresponding to the first defect category, for example, first alternative tip 700. Method 1016 also includes adjusting 1014 the maximum force of the defect repair tool 202 to a first force level associated with the first defect category. Adjusting 1014 the maximum force of the defect repair tool 202 may include moving a first housing, for example, defect repair tool 202, with respect to a second housing, for example, second housing 204, such that the second end 304 of the defect repair tool 202 is substantially aligned with an indicia, for example, first indicia 224 associated with the first force level. Method 1016 further includes positioning 1018 the first alternative tip 700 against defect 104, pulling 1020 a shaft, for example, handle 210 of shaft 212 (shown in FIG. 2) until fully extended, and releasing 1022 the handle 210 of the defect repair tool 202, causing defect repair tool 202 to exert a force on the defect 104.

The above-described embodiments facilitate efficient and cost-effective removal of defects from metal panels. The embodiments described herein enable a user to apply a known amount of force, in a consistent and repeatable manner, to remove and/or reduce the appearance of a defect in a metal panel. The embodiments also allow a user to remove defects in locations that typically are difficult to reach with known tools and techniques. The simplicity of pulling and releasing the handle to apply the desired force makes this apparatus easier to use than known defect removal techniques.

Because the tool is capable of a minimal force of zero pounds per square inch (psi), defects within lighter gauges of material can be removed. The replaceable tips allow the tool to be customized to most successfully remove many types of defects. The material from which the tip is formed and the shape of the tip both effect performance of the tool. For example, plastic tips are less durable than steep tips, but reduce the chance that the tool will damage a painted surface. Steel and plastic coated steel tips are more durable than plastic, and may be best suited for some applications. For example, a steel tip may be needed instead of a plastic or nylon tip in the case where the material properties have changed (e.g., became harder) because of the various processes the panel may go through after stamping. Moreover, a steel tip with a larger radius will reduce the chance of puncturing a material compared to a more pointed tip.

Defect repair tool 202 may also be used to remove creases or negative lines (scratches). For example, a nylon tip may be used to applying pressure in a line along the positive side of the defect, returning the material back to the original shape.

Although defect repair tool 202 may remove some defects without additional handwork, in other situations, defect repair tool 202 can bring the material reasonably close to the original shape, thereby reducing the work and time required to remove the defect. Further uses of defect repair tool 202 include verifying spot welds and as a glass breaker, for example, for rescue purposes.

Although specific features of various embodiments of the invention may be shown in some drawings and not others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A tool for repairing defects in sheet metal, said tool comprising:
   a first housing including a first end and a second end, said first housing defining an interior portion of said first housing and an exterior surface of said first housing;
   a second housing including a first end and a second end, said second housing configured to extend at least partially within said interior portion of said first housing, said second housing defining an interior portion of said second housing and an exterior surface of said second housing;
   a shaft positioned at least partially within said interior portion of said first housing and said interior portion of said second housing, said shaft including a first end and a second end, said shaft configured to move substantially along a longitudinal axis of said tool with respect to said first housing and said second housing;
   an anvil coupled to said second end of said second housing;
   a biasing device coupled to said shaft and to said anvil; and
   a tip coupled to said anvil, said anvil configured to be selectively contacted by said shaft, and to transmit a force received from said shaft to said tip.

2. The tool of claim 1 wherein said biasing device is configured to bias said second end of said shaft toward said anvil.

3. The tool of claim 1 further comprising a handle coupled to said first end of said shaft and positioned at least partially exterior to said first housing and said second housing.

4. The tool of claim 3 wherein said force comprises a restoring force created in said biasing device by a user stretching said biasing device by pulling said handle in a first direction.

5. The tool of claim 4 wherein said shaft is configured to transmit, to said anvil, said restoring force from said biasing device contracting from an extended state to an equilibrium state.

6. The tool of claim 1 further comprising an adjustment collar coupled to said first housing, wherein said adjustment collar and said first housing are movable with respect to said second housing to set a maximum amount of said force that said tool can produce.

7. The tool of claim 6 wherein said adjustment collar includes a locking device to selectively couple said first housing in a specified position with respect to said second housing.

8. The tool of claim 7 wherein said locking device comprises a set screw configured to extend through said adjustment collar and to press against said exterior surface of said second housing when tightened.

9. The tool of claim 1 wherein said second housing includes indicia indicating a plurality of force levels, wherein said indicia includes a first mark corresponding to a first force level and a second mark corresponding to a second force level.

10. The tool of claim 9 wherein each of said plurality of force levels is a predetermined maximum amount of said force that said tool can produce when an edge of said adjustment collar is substantially aligned with the corresponding indicia.

11. The tool of claim 9 wherein said first force level is an amount of force able to remove a defect having a first depth and said second force level is an amount of force able to remove a defect having a second depth.

12. The tool of claim 1 wherein said tip comprises one of a plurality of removable tips.

13. The tool of claim 12 wherein said tip includes a threaded portion and said anvil includes a corresponding threaded portion.

14. The tool of claim 12 wherein said plurality of removable tips comprises a first tip configured to remove a first type of defect and a second tip configured to remove a second type of defect.

15. The tool of claim 14 wherein said first type of defect comprises a dent having a diameter from approximately one millimeter to three millimeters.

16. A method for repairing a defect in sheet metal using a defect repair tool, wherein the defect repair tool includes a plurality of removable tips and an adjustable maximum force, said method comprising:
   identifying a first defect category of a plurality of defect categories that defines the defect;
   positioning, on the defect repair tool, a first tip of the plurality of removable tips associated with the first defect category;
   adjusting the maximum force of the defect repair tool to a first force level associated with the first defect category;
   positioning the first tip against the defect;
   pulling a shaft of the defect repair tool until fully extended; and
   releasing the shaft of the defect repair tool to exert a force on the defect.

17. The method of claim 16 further comprising defining the plurality of defect categories based on at least one of a depth, a diameter, a shape, and a location of the defect.

18. The method of claim 16 further comprising determining, for each of the plurality of defect categories, a tip configuration able to substantially remove defects in that category and an amount of force necessary to remove defects in that category.

19. The method of claim 18 wherein the first force level is an amount of force predetermined to substantially remove a defect in the first defect category.

20. The method of claim 16 wherein adjusting the maximum force of the defect repair tool comprises moving a first housing of the defect repair tool with respect to a second housing of the defect repair tool, such that the second end of said first housing is substantially aligned with an indicia on the second housing associated with the first force level.

* * * * *